(12) United States Patent
Johnson et al.

(10) Patent No.: US 9,096,348 B2
(45) Date of Patent: Aug. 4, 2015

(54) ITEM STABILIZER

(71) Applicant: Signode Industrial Group LLC, Glenview, IL (US)

(72) Inventors: Marc Steven Johnson, Murfreesboro, TN (US); Michael Scott Carroll, Macon, GA (US); Christopher Wayne Baker, Murfreesboro, TN (US)

(73) Assignee: Signode Industrial Group LLC, Glenview, IL (US)

( * ) Notice: Subject to any disclaimer, the term of this patent is extended or adjusted under 35 U.S.C. 154(b) by 2 days.

(21) Appl. No.: 13/787,563

(22) Filed: Mar. 6, 2013

(65) Prior Publication Data

US 2013/0334235 A1    Dec. 19, 2013

Related U.S. Application Data

(60) Provisional application No. 61/661,178, filed on Jun. 18, 2012.

(51) Int. Cl.
| | |
|---|---|
| *B60P 7/08* | (2006.01) |
| *B65D 19/44* | (2006.01) |
| *B60P 7/10* | (2006.01) |
| *B60P 7/16* | (2006.01) |
| *B65D 90/00* | (2006.01) |

(52) U.S. Cl.
CPC . *B65D 19/44* (2013.01); *B60P 7/10* (2013.01); *B60P 7/16* (2013.01); *B65D 90/006* (2013.01)

(58) Field of Classification Search
CPC ............. B60P 7/16; B60P 7/10; B65D 19/44; B65D 90/006
USPC ............. 410/155, 154, 120, 121, 117, 39, 40, 410/41, 46, 49, 87, 90, 94; 206/453, 600, 206/523, 593, 592, 586; 108/51.3, 55.3, 108/57.17, 57.18, 57.29, 57.33; 248/346.4, 248/346.5
See application file for complete search history.

(56) References Cited

U.S. PATENT DOCUMENTS

| | | | |
|---|---|---|---|
| 994,822 | A | 6/1911 | Daly |
| 1,514,512 | A | 11/1924 | James |

(Continued)

OTHER PUBLICATIONS

Intermodal Loading Guide for Products in Closed Trailers and Containers, Circular No. 43-E, Pamphlet No. 45, BOE Pamphlet No. 6C, Published by A AR/TT CI, issued Jul. 1, 2011, available at http://www.ns-direct.com/sites/default/files/kcfinder/files/AAR-intermodal-PDF.pdf (214 pages).

*Primary Examiner* — Stephen Gordon
(74) *Attorney, Agent, or Firm* — Neal, Gerber & Eisenberg LLP (57) ABSTRACT

An item stabilizer configured to prevent lateral movement of an item (such as a product-supporting pallet) in a transport container. The item stabilizer includes a first item side engager, a second item side engager, and a connector attached to each of the item side engagers such that an item can be positioned on the connector between the item side engagers. The item stabilizer is configured to prevent movement of the item by engaging opposite sides of the item while the weight of the item and any products thereon or therein rest on the connector, thereby preventing the connector and the item side engagers themselves from moving laterally. Each item side engager respectively extends between one side of the item and one of the side walls of the transport container to limit the lateral movement of the item. Multiple item stabilizers can work together to hold an item in place.

30 Claims, 7 Drawing Sheets

(56) References Cited

U.S. PATENT DOCUMENTS

| | | | |
|---|---|---|---|
| 2,075,711 | A | 3/1937 | Gilley |
| 2,341,088 | A * | 2/1944 | Ellis ............................ 410/155 |
| 2,363,256 | A | 11/1944 | Manning et al. |
| 2,663,417 | A * | 12/1953 | Kincaid |
| 2,838,173 | A | 6/1958 | Emery |
| 3,067,699 | A | 12/1962 | Fredriks |
| 3,091,348 | A | 5/1963 | Neuhauser |
| 3,098,455 | A | 7/1963 | McElroy |
| 3,131,648 | A | 5/1964 | Seger |
| 3,145,853 | A | 8/1964 | Langenberg |
| 3,220,583 | A | 11/1965 | Robertson |
| 3,263,830 | A | 8/1966 | Carl |
| 3,385,429 | A | 5/1968 | Becker et al. |
| 3,581,675 | A | 6/1971 | Kauffman |
| 3,618,535 | A | 11/1971 | Hees |
| 3,685,460 | A | 8/1972 | Seteele |
| 3,872,799 | A | 3/1975 | Dousset |
| 4,008,669 | A | 2/1977 | Sumrell |
| 4,102,274 | A | 7/1978 | Feary |
| 4,386,881 | A | 6/1983 | Liebel |
| 4,494,897 | A | 1/1985 | Rogers |
| 4,572,716 | A | 2/1986 | West |
| 4,702,311 | A | 10/1987 | Bizard |
| 4,854,792 | A | 8/1989 | Cottone |
| 5,062,751 | A | 11/1991 | Liebel |
| 5,161,703 | A | 11/1992 | Patton |
| 5,181,814 | A | 1/1993 | Woods et al. |
| 5,636,951 | A | 6/1997 | Long |
| 5,678,968 | A | 10/1997 | Bourgeois et al. |
| 5,855,459 | A | 1/1999 | Krier et al. |
| 5,899,331 | A | 5/1999 | Warren |
| 5,934,467 | A | 8/1999 | Gilfert et al. |
| 6,033,167 | A | 3/2000 | Bourgeois |
| 6,209,839 | B1 | 4/2001 | O'Malley |
| 6,231,284 | B1 | 5/2001 | Kordel |
| 6,702,532 | B1 * | 3/2004 | Throener ........................ 410/94 |
| 6,820,745 | B1 | 11/2004 | Ono et al. |
| 7,195,435 | B2 | 3/2007 | Clark |
| 7,798,754 | B2 | 9/2010 | Funk et al. |
| 2005/0204707 | A1 | 9/2005 | Duke et al. |
| 2009/0308289 | A1 * | 12/2009 | Ferguson |

* cited by examiner

ITEM STABILIZER

PRIORITY CLAIM

This application is a non-provisional of, claims the benefit of, and priority to U.S. Provisional Patent Application Ser. No. 61/661,178, filed Jun. 18, 2012, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Various items are transported throughout the world. For example, various products are transported throughout the world on pallets. Items such as the products and the product-supporting pallets are typically transported in a wide variety of transport containers (such as trailers towed by semi-trailer trucks and cargo containers).

In certain instances, when items such as product-supporting pallets (with products thereon) are loaded into one of these transport containers, the product-supporting pallets completely fill the transport container. However, in many instances, when items such as product-supporting pallets (with products thereon) are loaded into one of these transport containers, the product-supporting pallets do not completely fill the transport container. For example, a transport container having a maximum capacity of twenty-eight product-supporting pallets may only include twenty-three product-supporting pallets in a given shipment. Since this shipment includes less than the maximum capacity of product-supporting pallets, certain of the product-supporting pallets are arranged side by side and one or more other product-supporting pallets are each centrally positioned (relative to the side walls of the transport container) to fill the transport container from front to back.

In such situations, the centrally positioned items such as product-supporting pallets can move or slide laterally during movement of the transport container. For example, a centrally positioned product-supporting pallet in a trailer being towed by a semi-trailer truck may move or slide laterally when the semi-trailer truck turns. Such lateral movement can cause the loads provided by the product-supporting pallets to vary during transport and become unevenly distributed. This introduces instability into the transport container during transport, and can increase the difficulty of maneuvering the vehicle transporting the transport container. Additionally, such lateral movement can cause damage to the product-supporting pallets themselves or the products thereon. For example, a centrally positioned product-supporting pallet may slide toward and collide with the side wall of the transport container, causing damage to the product-supporting pallet and/or the products thereon.

One proposed solution to such problems involves nailing or spiking lumber to the floor of the transport container to limit lateral movement of a centrally positioned item such as a product-supporting pallet. Specifically, in this proposed solution, a piece of lumber that extends between one of the sides of the product-supporting pallet and the respective side wall of the transport container is nailed into the floor of the transport container, and another piece of lumber that extends between the other side of the product-supporting pallet and the respective side wall of the transport container is nailed into the floor of the transport container.

While this proposed solution may limit lateral movement of the centrally positioned item such as the product-supporting pallet, it introduces additional problems. First, this proposed solution is material intensive in that it requires the use of multiple nails and multiple pieces of lumber. Second, the nails and the lumber of this proposed solution are not reusable. Third, this proposed solution is labor intensive. Specifically, this proposed solution requires a worker to: gather a piece lumber of the correct size or cut a piece of lumber to the correct size, position the piece of lumber between one of the sides of the product-supporting pallet and the respective side wall of the transport container, locate a hammer and nails or a nail gun, use the hammer and nails or the nail gun to nail the piece of lumber into place, and repeat the process on the other side. This proposed solution also requires a worker to remove the lumber and nails from the floor of the transport container when the transport container reaches its destination. Fourth, this proposed solution damages the floor of the transport container. Fifth, nails that are not completely removed from the floor of the transport container create a safety hazard and a risk of damage to product-supporting pallets loaded into the same transport container in the future. Sixth, the floors of certain transport containers include a steel plate that may prevent the lumber from being nailed into the floor of the transport container, rendering this proposed solution unusable. Seventh, the use of untreated lumber in this proposed solution can create an infestation problem that may require the entire transport container (including the product-supporting pallet and the products thereon) to be fumigated before being unloaded.

Accordingly, there is a need for new and improved manners of stabilizing items such as product-supporting pallets in transport containers that overcome these disadvantages.

SUMMARY

Various embodiments of the present disclosure provide an item stabilizer configured to prevent lateral movement of an item (such as a product-supporting pallet) in a transport container and thus solve the above-mentioned problems. In one embodiment, the item stabilizer of the present disclosure includes a first item side engager, a second item side engager, and a connector which is attached to each of the item side engagers such that an item (such as a product-supporting pallet) can be positioned on the connector between the item side engagers. The item stabilizer is configured to prevent lateral movement of the item by engaging opposite sides of the item while the weight of the item itself and any products thereon or therein rest on the connector, thereby preventing the connector and the item side engagers themselves from moving laterally. Each item side engager respectively extends between one side of the item and one of the side walls of the transport container to limit the lateral movement of the item. The present disclosure contemplates two or more item stabilizers working together to hold an item in place.

In certain embodiments, the item stabilizer of the present disclosure has an expanded or unfolded position and a collapsed or folded position. The folded position is primarily for storage of the item stabilizer itself when the item stabilizer is not in use or for shipping when the item stabilizer is itself being shipped.

The item side engagers of the item stabilizer of the present disclosure are of sufficient size (i.e., height and width) such that they provide enough purchase area to engage the sides of the item and the side walls of the transport container. The connector is preferably of minimal size (i.e., height) such that it does not interfere with the item when the item is placed on the connector, and such that a forklift or pallet jack can easily roll over the connector.

The item stabilizer of the present disclosure may be constructed of any suitable material. In certain embodiments, the item stabilizer is constructed from relatively lightweight, recyclable, biodegradable, and cost-effective materials such as corrugated fiberboard.

Additional features and advantages are described in, and will be apparent from, the following Detailed Description and the Figures.

DETAILED DESCRIPTION

The present disclosure contemplates that the item stabilizers described herein may be employed to stabilize any suitable item that is stable at its top and configured to be secured at its bottom. For example, the item stabilizers of the present disclosure may be employed to stabilize product-supporting pallets, skids, containers or bins, blocks, and/or slip sheets. The present disclosure is described below in relation to use with product-supporting pallets for ease of illustration; however, it should be appreciated that the present disclosure is not limited to stabilizing pallets. For ease of description and clarity, the item stabilizers illustrated in the drawings and described below are configured to stabilize product-supporting pallets, and are thus referred to herein as pallet stabilizers.

Figure 1:
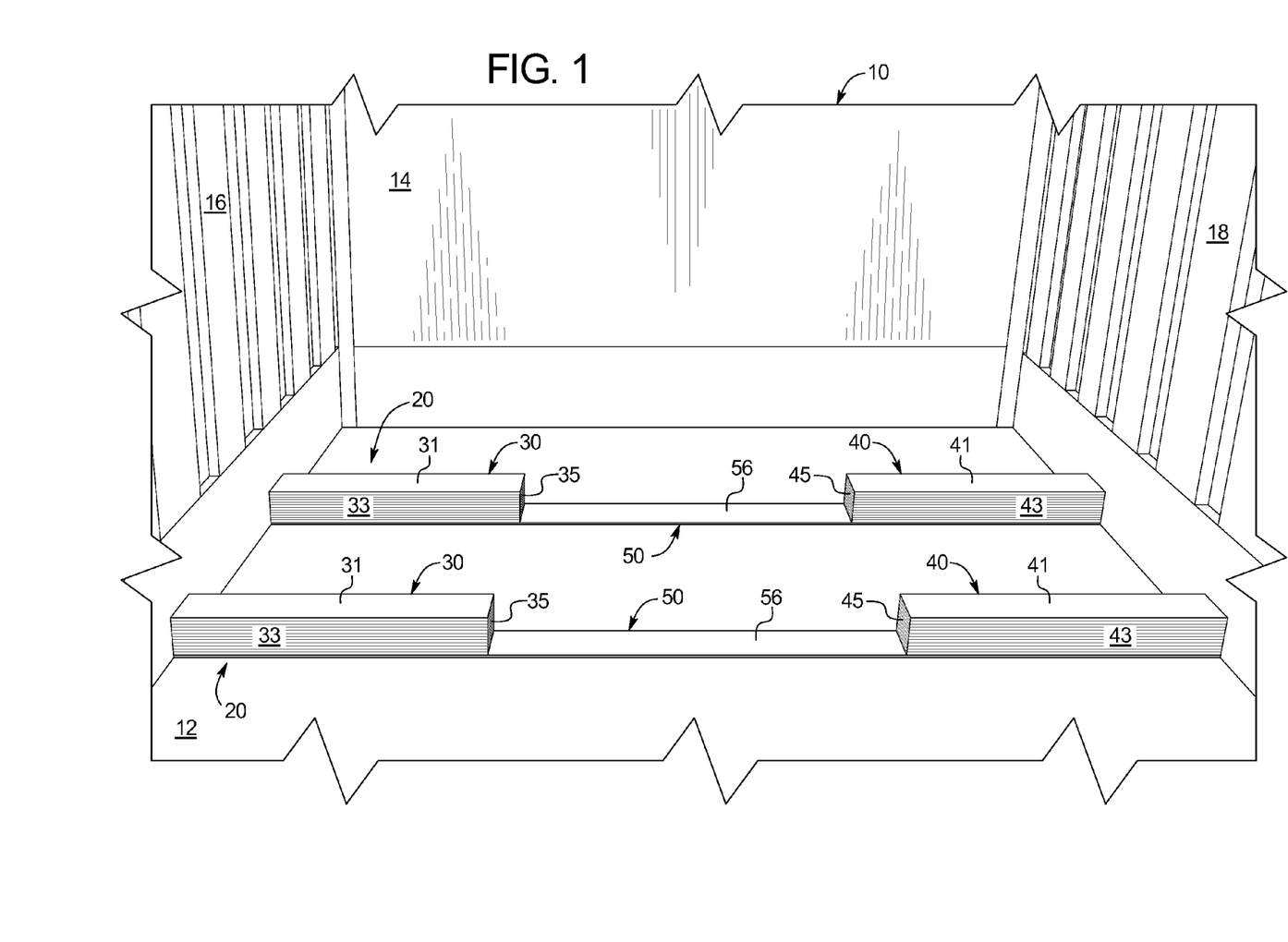
FIG. 1 is a top front perspective view of two pallet stabilizers of one embodiment of the present disclosure, wherein the pallet stabilizers are positioned on a floor inside of a front portion of a transport container (which is shown in fragmentary).
Figure 2:
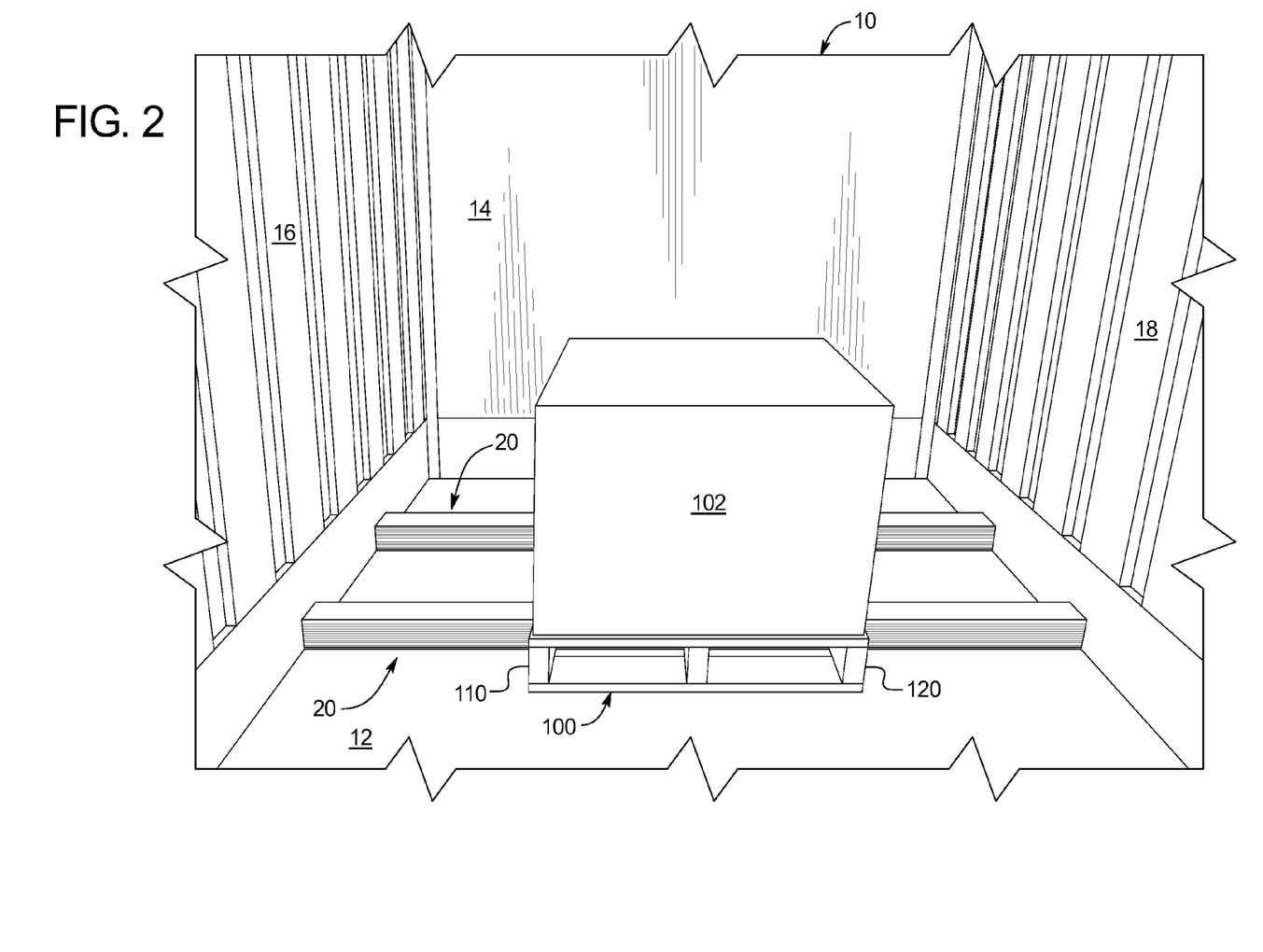
FIG. 2 is a top front perspective view of the two pallet stabilizers of FIG. 1 and a product-supporting pallet positioned on the pallet stabilizers on the floor inside of the front portion of the transport container (which is shown in fragmentary).
Figure 3:
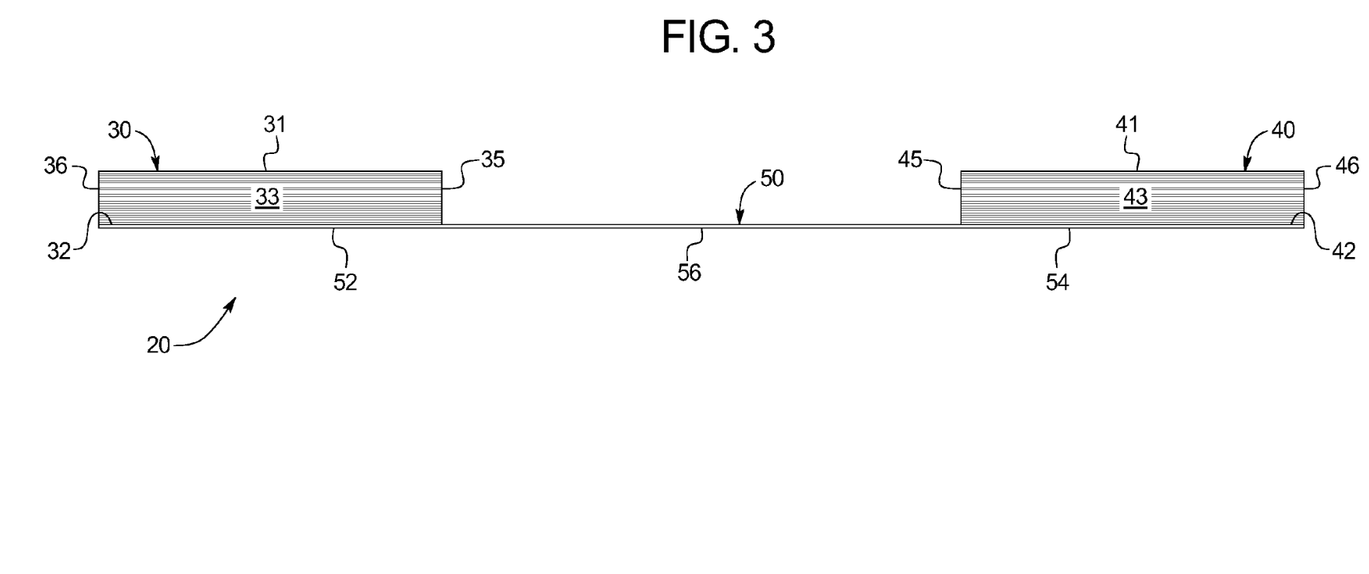
FIG. 3 is a front view of one of the pallet stabilizers of FIG. 1 positioned in a fully expanded or unfolded position.

Referring now to the drawings, FIGS. 1, 2, and 3 illustrate one example embodiment of a pallet stabilizer of the present disclosure. FIGS. 1, 2, and 3 also show how multiple pallet stabilizers of the present disclosure can be used together to prevent lateral movement of a product-supporting pallet in a transport container (or in another location). In this illustrated example, transport container 10 includes a floor 12, a front wall 14, a first side wall 16, a second side wall 18, and a ceiling (not shown). The first side wall 16 and the second side wall 18 are spaced apart from side to side a designated distance or length. It should be appreciated that the pallet stabilizer of the present disclosure can be formed and sized such that the pallet stabilizer can be employed in a transport container of any suitable shape and size. In this illustrated example, two pallet stabilizers of the present disclosure are used to secure the product-supporting pallet in place in the transport container 10.

In this illustrated example embodiment, each pallet stabilizer, which is generally indicated by numeral 20, is configured to be positioned on the floor 12 of the transport container 10 between the first side wall 16 and the second side wall 18. Each pallet stabilizer 20 includes a first pallet side engager 30, a second pallet side engager 40, and a connector 50. The connector 50 connects the first pallet side engager 30 to the second pallet side engager 40 in a spaced apart relation such that a product-supporting pallet, such as product-supporting pallet 100, can be positioned on the connector 50 between the first pallet side engager 30 and the second pallet side engager 40.

In this illustrated embodiment, the first pallet side engager 30 has a generally rectangular shape and includes a top wall 31, a bottom wall 32, a first side wall 33, a second side wall (not shown), a first end wall 35, and a second end wall 36. The first end wall 35 is configured to be adjacent to or abut the side of a product-supporting pallet when the product-supporting pallet is placed on the connector 50. For instance, as shown in FIG. 2, the first end wall 35 of the first pallet side engager 30 is adjacent to or abuts side 110 of the product-supporting pallet 100. The second end wall 36 is configured to be adjacent to or abut one of the side walls of the transport container. For instance, as shown in FIG. 2, the second end wall 36 of the first pallet side engager 30 is adjacent to or abuts the first side wall 16 of the transport container 10.

Similarly, in this illustrated embodiment, the second pallet side engager 40 has a generally rectangular shape and includes a top wall 41, a bottom wall 42, a first side wall 43, a second side wall (not shown), a first end wall 45, and a second end wall 46. The first end wall 45 is configured to be adjacent to or abut the side of a product-supporting pallet when the product-supporting pallet is placed on the connector 50. For instance, as shown in FIG. 2, the first end wall 45 of the second pallet side engager 40 is adjacent to or abuts side 120 of the product-supporting pallet 100. The second end wall 46 is configured to be adjacent to or abut one of the side walls of the transport container. For instance, as shown in FIG. 2, the second end wall 46 of the second pallet side engager 40 is adjacent to or abuts the second side wall 18 of the transport container 10.

In this illustrated embodiment, the connector 50 includes a first section 52 attached to the bottom wall 32 of the first pallet side engager 30, a second section 54 attached to the bottom wall 42 of the second pallet side engager 40, and a central section 56 connected to and extending between the first section 52 and the second section 54. The connector 50 and, specifically, the first section 52 and the second section 54, may be respectively attached to the bottom wall 32 of the first pallet side engager 30 and the bottom wall 42 of the second pallet side engager 40 in any suitable manner (as described below).

The pallet stabilizer 20 is thus configured to prevent lateral movement of the product-supporting pallet 100 by engaging opposite sides 110 and 120 of the product-supporting pallet 100 while the weight of the product-supporting pallet 100 and the products 102 on the product-supporting pallet 100 rest on the connector 50, thereby preventing the connector 50, the first pallet side engager 30, and the second pallet side engager 40 from moving laterally. In the illustrated embodiment, each pallet side engager extends between one side of the product-supporting pallet and one side wall of the transport container.

It should be appreciated from the above that the present disclosure contemplates two or more pallet stabilizers working together to hold a product-supporting pallet in place; that is, to prevent the product-supporting pallet from moving laterally.

In the embodiment illustrated in FIGS. 1, 2, and 3, the first pallet side engager, the second pallet side engager, and the connector are each made from corrugated fiberboard. More specifically, in this illustrated embodiment, the first pallet side engager and the second pallet side engager are each made from multiple layers of corrugated fiberboard to provide the height and width necessary to provide the opposite end walls with sufficient size or purchase areas to engage the sides of the pallet and the side walls of the transport container. It should be appreciated that each pallet side engager may be formed from suitable alternative materials, such as plastic.

It should be appreciated that that the size and shape of the pallet stabilizers of the present disclosure may vary in accordance with the present disclosure. For example, the pallet stabilizer of the present disclosure may be made wider and/or taller to provide more purchase area against the sides of the product-supporting pallet. Further, as noted above, the pallet stabilizer may be formed and sized such that the pallet stabilizer can be employed in a transport container of any suitable shape and size.

Additionally, in the embodiment illustrated in FIGS. 1, 2, and 3, the first and second sections of the connector are attached to the respective pallet side engagers by a suitable adhesive. It should be appreciated that the connector may be attached to the pallet side engagers in any suitable manner. While in this illustrated embodiment the first and second sections of the connector are attached to and cover the entire bottom surfaces of the respective pallet side engagers, it should be appreciated that, in other embodiments, the first and second sections of the connector are attached to and cover less than the entire bottom surfaces of the respective pallet side engagers.

The pallet stabilizers illustrated in FIGS. 1, 2, and 3 are shown in an expanded or unfolded position. The present disclosure contemplates that, in certain embodiments, the pallet stabilizer is configured to be manipulated into a folded or collapsed position for storage and shipping of the pallet stabilizer itself when not in use.

Figure 4:
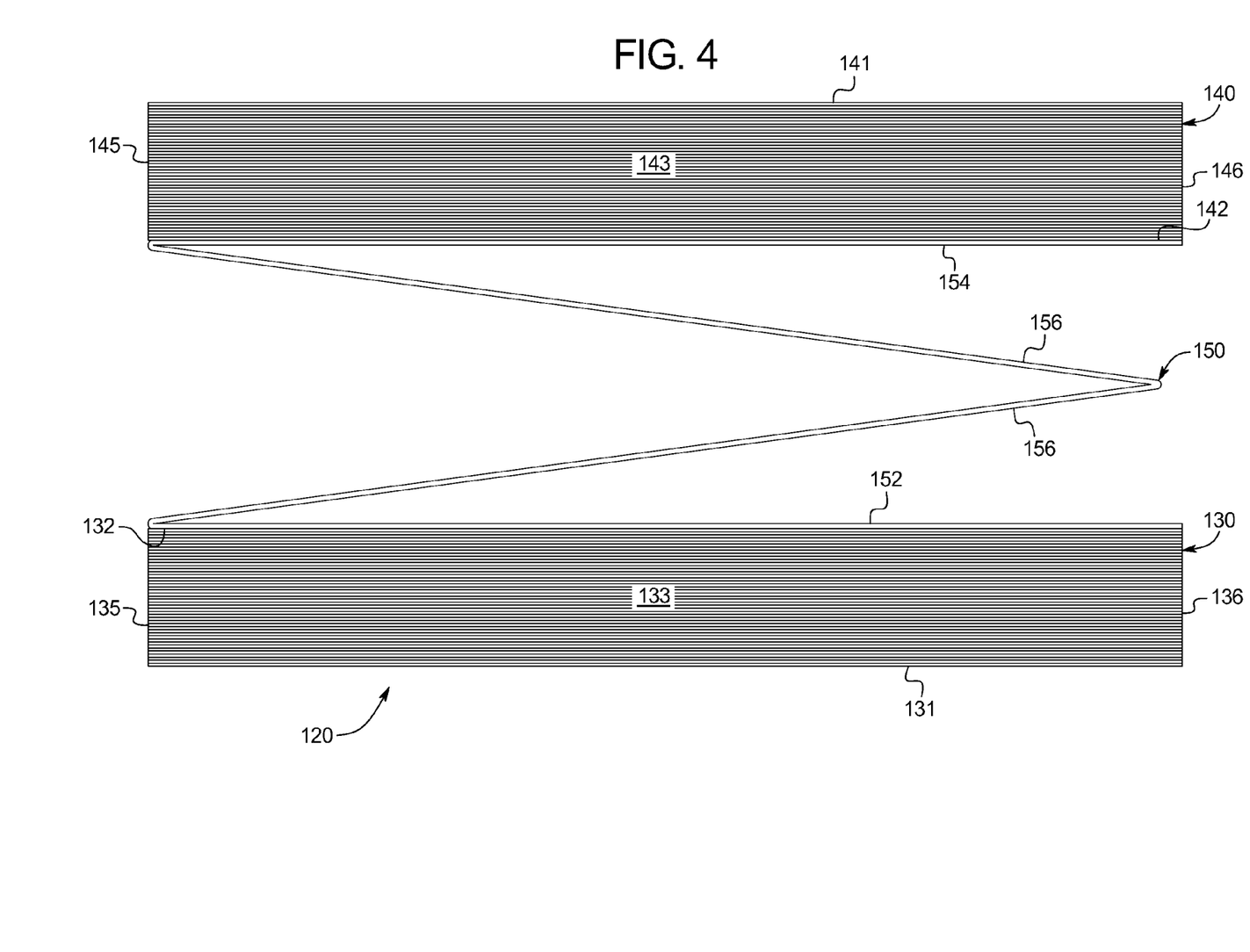
FIG. 4 is a front view of a pallet stabilizer of one embodiment of the present disclosure positioned in a partially expanded or partially folded position.

FIG. 4 illustrates one embodiment of a pallet stabilizer 120 in a partially expanded or partially folded position. Pallet stabilizer 120 includes a first pallet side engager 130, a second pallet side engager 140, and a connector 150. The connector 150 connects the first pallet side engager 130 to the second pallet side engager 140 in a spaced apart relation such that a product-supporting pallet can be positioned on the connector 150 between the first pallet side engager 130 and the second pallet side engager 140. The first pallet side engager 130 has a generally rectangular shape and includes a top wall 131, a bottom wall 132, a first side wall 133, a second side wall (not shown), a first end wall 135, and a second end wall 136. The first end wall 135 is configured to be adjacent to or abut the side of a product-supporting pallet when the product-supporting pallet is placed on the connector 150. The second end wall 136 is configured to be adjacent to or abut one of the side walls of the transport container.

Similarly, the second pallet side engager 140 has a generally rectangular shape and includes a top wall 141, a bottom wall 142, a first side wall 143, a second side wall (not shown), a first end wall 145, and a second end wall 146. The first end wall 145 is configured to be adjacent to or abut the side of a product-supporting pallet when the product-supporting pallet is placed on the connector 150. The second end wall 146 is configured to be adjacent to or abut one of the side walls of the transport container.

In this illustrated embodiment, the connector 150 includes a first section 152 attached to the bottom wall 132 of the first pallet side engager 130, a second section 154 attached to the bottom wall 142 of the second pallet side engager 140, and a central section 156 connected to and extending between the first section 152 and the second section 154. In this embodiment, the pallet stabilizer 120 is configured to fold upon itself along three fold lines included in the connector 150 into a folded or collapsed position. Although not shown, it should be appreciated that, in certain embodiments, the connector may include scores along one or more of the fold lines that facilitate folding and unfolding.

Figure 5:
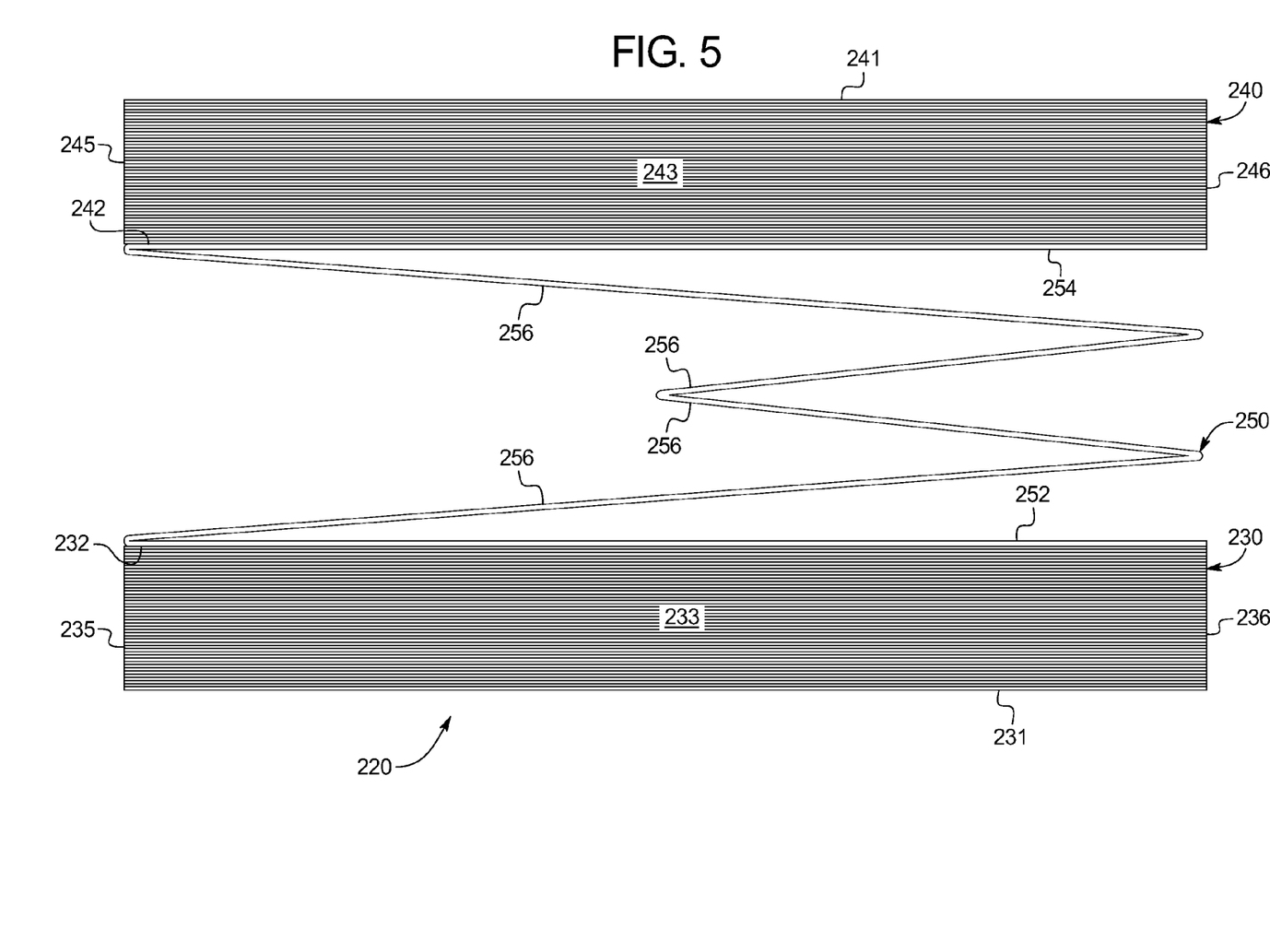
FIG. 5 is a front view of a pallet stabilizer of another embodiment of the present disclosure positioned in a partially expanded or partially folded position.

FIG. 5 illustrates another embodiment of a pallet stabilizer 220 in a partially expanded or partially folded position. Pallet stabilizer 220 includes a first pallet side engager 230, a second pallet side engager 240, and a connector 250. The connector 250 connects the first pallet side engager 230 to the second pallet side engager 240 in a spaced apart relation such that a product-supporting pallet can be positioned on the connector 250 between the first pallet side engager 230 and the second pallet side engager 240. The first pallet side engager 230 has a generally rectangular shape and includes a top wall 231, a bottom wall 232, a first side wall 233, a second side wall (not shown), a first end wall 235, and a second end wall 236. The first end wall 235 is configured to be adjacent to or abut the side of a product-supporting pallet when the product-supporting pallet is placed on the connector 250. The second end wall 236 is configured to be adjacent to or abut one of the side walls of the transport container.

Similarly, the second pallet side engager 240 has a generally rectangular shape and includes a top wall 241, a bottom wall 242, a first side wall 243, a second side wall (not shown), a first end wall 245, and a second end wall 246. The first end wall 245 is configured to be adjacent to or abut the side of a product-supporting pallet when the product-supporting pallet is placed on the connector 250. The second end wall 246 is configured to be adjacent to or abut one of the side walls of the transport container.

In this illustrated embodiment, the connector 250 includes a first section 252 attached to the bottom wall 232 of the first pallet side engager 230, a second section 254 attached to the bottom wall 242 of the second pallet side engager 240, and a central section 256 connected to and extending between the first section 252 and the second section 254. In this embodiment, the pallet stabilizer 220 is configured to fold upon itself along five fold lines included in the connector 250 into a folded or collapsed position. It should be appreciated that the pallet stabilizer may be configured to fold or collapse in any suitable manner and employing any suitable quantity of fold lines in any suitable locations. Further, as noted above with respect to FIG. 4, although not shown, it should be appreciated that, in certain embodiments, the connector may include scores along one or more of the fold lines that facilitate folding and unfolding.

Figure 6:
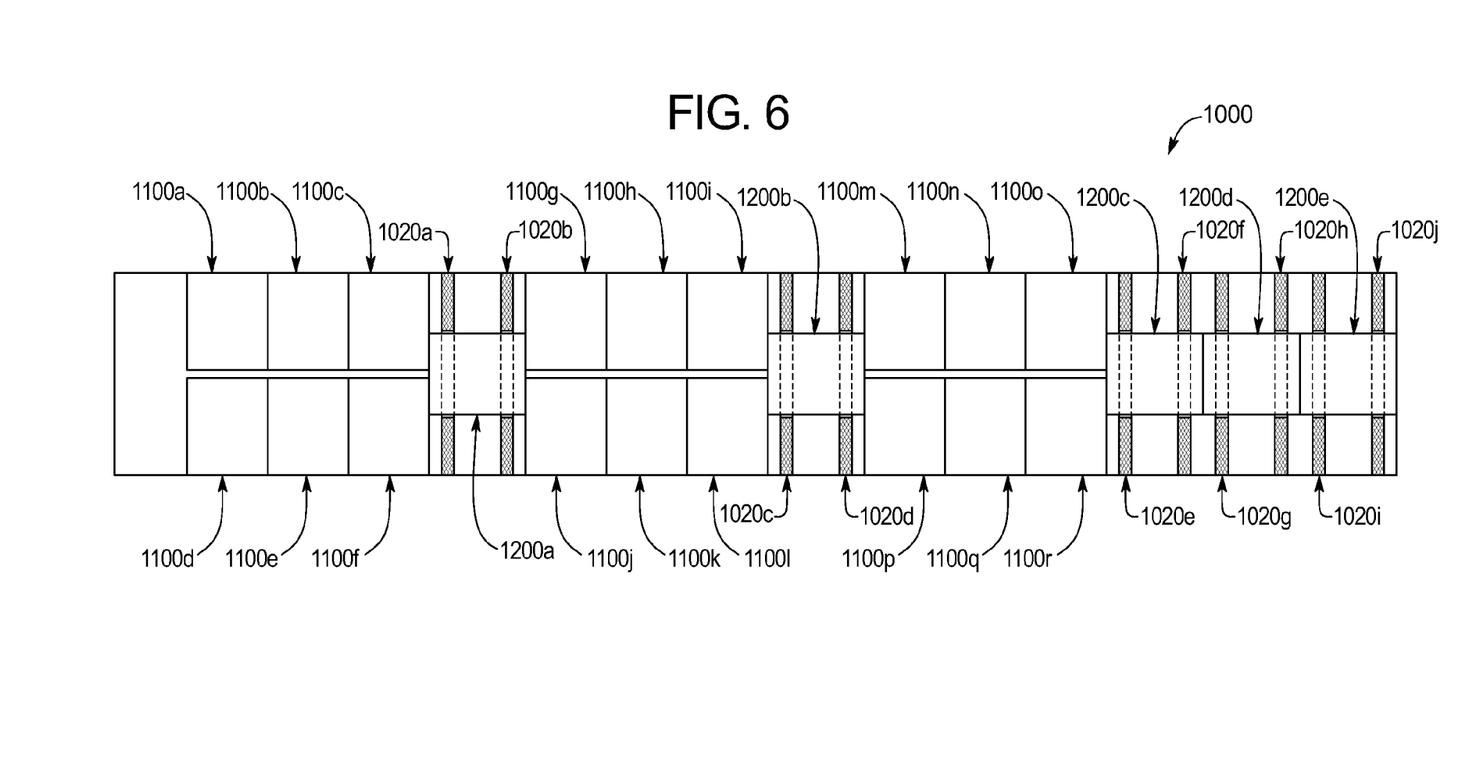
FIG. 6 is a diagrammatic top view of a plurality of product-supporting pallets positioned in a transport container in side by side arrangements and in centrally positioned single arrangements, wherein the product-supporting pallets in the centrally positioned single arrangements are held in place by the pallet stabilizers of the present disclosure.

Referring now to FIG. 6, one example use of the pallet stabilizers of the present disclosure in a transport container is generally illustrated. In this example, transport container 1000 has a maximum capacity of twenty-eight product supporting pallets (of the size shown). In this illustrated example, however, the shipment includes only twenty-three product-supporting pallets 1100a, 1100b, 1100c, 1100d, 1100e, 1100f, 1100g, 1100h, 1100i, 1100j, 1100k, 1100l, 1100m, 1100n, 1100o, 1100p, 1100q, 1100r, 1200a, 1200b, 1200c, 1200d, and 1200e. Since the shipment includes less product-supporting pallets than the maximum capacity, the product-supporting pallets 1100a, 1100b, 1100c, 1100d, 1100e, 1100f, 1100g, 1100h, 1100i, 1100j, 1100k, 1100l, 1100m, 1100n, 1100o, 1100p, 1100q, and 1100r are arranged side by side and the product-supporting pallets 1200a, 1200b, 1200c, 1200d, and 1200e are each centrally positioned (with respect to the side walls of the transport container 1000). It should be appreciated that this multiple single pallet arrangement is employed to fill the transport container from front to back.

As shown in FIG. 6, in this illustrated example two pallet stabilizers are employed for each of the five centrally positioned product-supporting pallets to prevent the lateral movement of each of the five centrally positioned product-supporting pallets. More specifically, pallet stabilizers 1020a and 1020b are employed for centrally positioned product-supporting pallet 1200a, pallet stabilizers 1020c and 1020d are employed for centrally positioned product-supporting pallet 1200b, pallet stabilizers 1020e and 1020f are employed for centrally positioned product-supporting pallet 1200c, pallet stabilizers 1020g and 1020h are employed for centrally positioned product-supporting pallet 1200d, and pallet stabilizers 1020i and 1020j are employed for centrally positioned product-supporting pallet 1200e to prevent lateral movement of the centrally positioned product-supporting pallets 1200a, 1200b, 1200c, 1200d, and 1200e.

Figure 7:
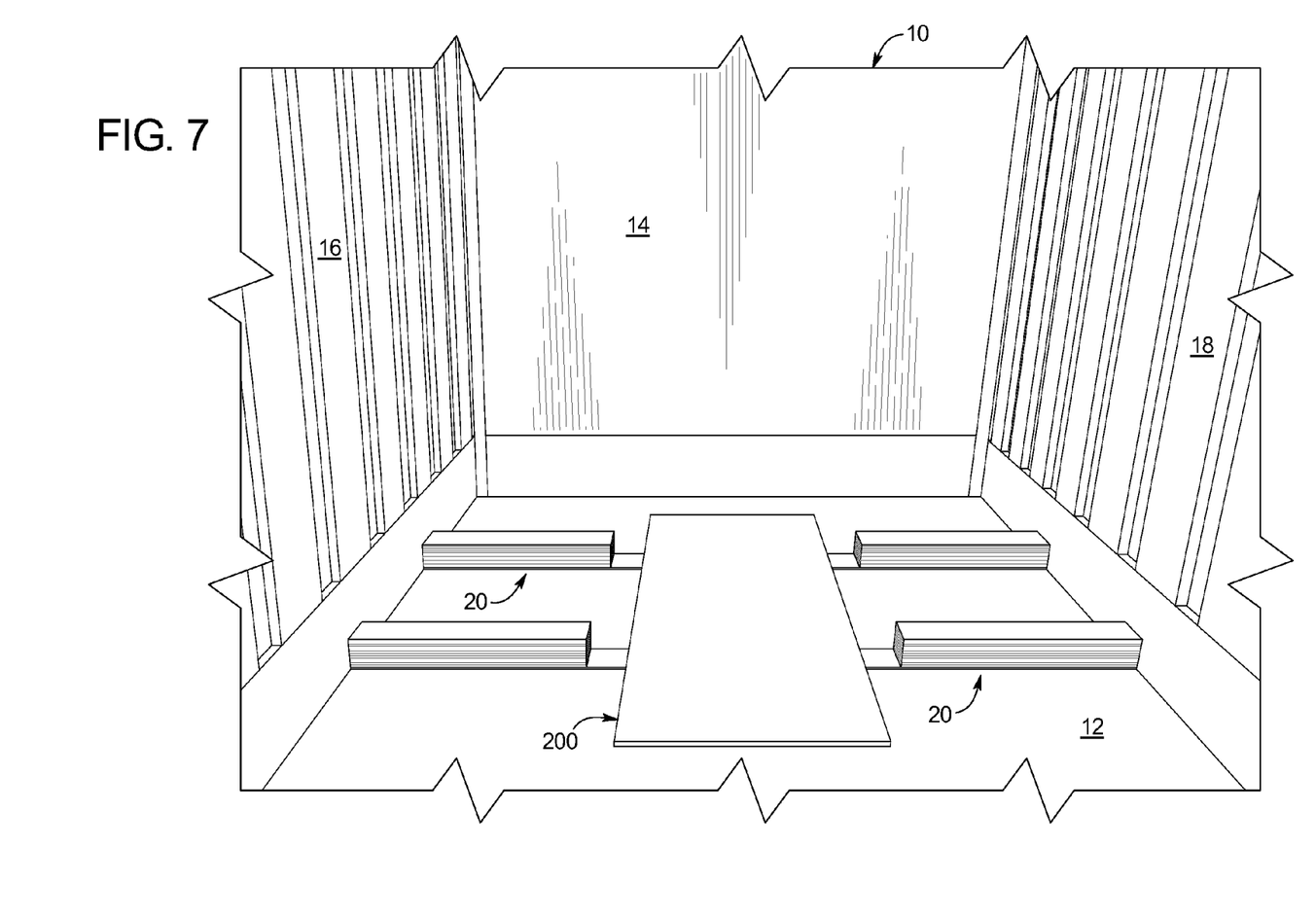
FIG. 7 is a top front perspective view of the two pallet stabilizers of FIG. 1 and a protector pad positioned on the connectors of the pallet stabilizers on the floor inside of the front portion of the transport container (which is shown in fragmentary).

Referring now FIG. 7, the present disclosure contemplates that, in certain embodiments, a protector pad 200 may positioned on or over the connectors of the two pallet stabilizers 20 on the floor 12 inside of the front portion of the transport container 10. When positioned on or over the connector of a pallet stabilizer, the protector pad is configured to reduce the likelihood that the connector will be damaged, such as by a forklift or a pallet jack. It should be appreciated that the protector pad may be made of any suitable material, such as rubber. It should further be appreciated that, in other embodiments, a protector pad is not employed.

It should be understood that modifications and variations may be effected without departing from the scope of the novel concepts of the present disclosure, and it should be understood that this application is to be limited only by the scope of the appended claims.

The invention is claimed as follows:

1. An item stabilizer comprising:
a first item side engager;
a second item side engager; and
a connector including an upper face, a lower face, a first side edge, a second side edge, a first end edge, and a second end edge, said connector configured to be unfolded from a folded position into an unfolded position wherein in said folded position, a first section of the upper face of the connector faces a second section of the upper face of the connector, said connector connecting the first item side engager to the second item side engager in a spaced apart relation in the unfolded position such that:
(a) an item can be positioned on the upper face of the connector between the first item side engager and the second item side engager when the connector is in the unfolded position, and (b) the first item side engager can engage a first side of the item and the second side engager can engage a second opposite side of the item when the connector is in the unfolded position.

2. The item stabilizer of claim 1, wherein the upper face of the connector is connected to a bottom of the first item side engager and a bottom of the second item side engager.

3. The item stabilizer of claim 1, wherein a third section of the upper face of the connector is attached to the first item side engager, a fourth section of the upper face of the connector is attached to the second item side engager, and the first section of the upper face of the connector and the second section of the upper face of the connector extend between the third section of the upper face of the connector and the fourth second section of the upper face of the connector.

4. The item stabilizer of claim 3, wherein the third section of the upper face of the connector is attached to a bottom wall of the first item side engager, and the fourth section of the upper face of the connector is attached to a bottom wall of the second item side engager.

5. The item stabilizer of claim 1, wherein the first item side engager has a generally rectangular shape and includes a first item side engager top wall, a first item side engager bottom wall, a first item side engager first side wall, a first item side engager second side wall, a first item side engager first end wall, and a first item side engager second end wall, said first item side engager bottom wall attached to the upper face of the connector.

6. The item stabilizer of claim 5, wherein the second item side engager has a generally rectangular shape and includes a second item side engager top wall, a second item side engager bottom wall, a second item side engager first side wall, a second item side engager second side wall, a second item side engager first end wall, and a second item side engager second end wall, said second item side engager bottom wall attached to the upper face of the connector.

7. The item stabilizer of claim 1, wherein a height of each of the first item side engager and the second item side engager is greater than a height of the connector.

8. The item stabilizer of claim 1, wherein the first item side engager, the second item side engager, and the connector are each made from corrugated fiberboard.

9. An item stabilizer comprising:
a first item side engager;
a second item side engager; and
a connector, wherein the first item side engager, the second item side engager, and the connector are configured to be unfolded from a folded position into an unfolded position, said connector including an upper face, a lower face, a first side edge, a second side edge, a first end edge, and a second end edge, said connector connecting the first item side engager to the second item side engager in a spaced apart relation such that an item can be positioned on the upper face of the connector between the first item side engager and the second item side engager when the first item side engager, the second item side engager, and the connector are in the unfolded position, the connector including a first section attached to the first item side engager, a second section attached to the second item side engager, and a central section connected to and extending between the first section and the second section,
wherein in the unfolded position:
a first portion of the lower face of the connector, a second portion of the lower face of the connector, a third portion of the lower face of the connector, and a fourth portion of the lower face of the connector face in a same direction, and wherein in the folded position:

the first portion of the lower face of the connector faces the second portion of the lower face of the connector, and the third portion of the lower face of the connector faces the fourth portion of the lower face of the connector.

10. The item stabilizer of claim 9, wherein the upper face of the first section of the connector is attached to a first item side engager bottom wall of the first item side engager and the upper face of the second section of the connector is attached to a second item side engager bottom wall of the second item side engager.

11. The item stabilizer of claim 9, wherein the first item side engager has a generally rectangular shape and includes a first item side engager top wall, a first item side engager bottom wall, a first item side engager first side wall, a first item side engager second side wall, a first item side engager first end wall, and a first item side engager second end wall, said first item side engager bottom wall attached to the upper face of the connector.

12. The item stabilizer of claim 11, wherein the second item side engager has a generally rectangular shape and includes a second item side engager top wall, a second item side engager bottom wall, a second item side engager first side wall, a second item side engager second side wall, a second item side engager first end wall, and a second item side engager second end wall, said second item side engager bottom wall attached to the upper face of the connector.

13. The item stabilizer of claim 9, wherein a height of each of the first item side engager and the second item side engager is greater than a height of the connector.

14. The item stabilizer of claim 9, wherein the first item side engager, the second item side engager, and the connector are each made from corrugated fiberboard.

15. The item stabilizer of claim 9, wherein the connector includes a plurality of fold lines.

16. An item stabilizer comprising:

a first item side engager including a first item side engager top wall, a first item side engager bottom wall, a first item side engager first side wall, a first item side engager second side wall, a first item side engager first end wall, and a first item side engager second end wall;

a second item side engager including a second item side engager top wall, a second item side engager bottom wall, a second item side engager first side wall, a second item side engager second side wall, a second item side engager first end wall, and a second item side engager second end wall; and a connector, wherein the first item side engager, the second item side engager, and the connector are configured to be unfolded from a folded position into an unfolded position, wherein in the unfolded position:

(a) the first item side engager first end wall faces the second item side engager first end wall, and (b) the first item side engager second end wall faces in an opposite direction as the second item side engager second end wall, wherein in the folded position:

(a) the first item side engager first end wall faces in a same first direction as the second item side engager first end wall, and (b) the first item side engager second end wall faces in a same second direction as the second item side engager second end wall, said connector including an upper face, a lower face, a first side edge, a second side edge, a first end edge, and a second end edge, said connector connecting the first item side engager to the second item side engager in a spaced apart relation such that an item can be positioned on the upper face of the connector between the first item side engager and the second item side engager when the first item side engager, the second item side engager, and the connector are in the unfolded position, the connector including a first section of the upper face attached to the bottom wall of the first item side engager, a second section of the upper face attached to the bottom wall of the second item side engager, and a central section connected to and extending between the first section and the second section.

17. The item stabilizer of claim 16, wherein a height of each of the first item side engager and the second item side engager is greater than a height of the connector.

18. The item stabilizer of claim 16, wherein the first item side engager, the second item side engager, and the connector are each made from corrugated fiberboard.

19. The item stabilizer of claim 16, wherein the connector includes a plurality of fold lines.

20. The item stabilizer of claim 16, wherein the first item side engager has a generally rectangular shape.

21. The item stabilizer of claim 16, wherein the second item side engager has a generally rectangular shape.

22. The item stabilizer of claim 1, wherein the connector has a length, a width, and a height, and wherein the width of the connector is greater than the height of the connector.

23. The item stabilizer of claim 1, wherein the connector has a length, a width, and a height, wherein the width of the connector is greater than the height of the connector, and the length of the connector is greater than the width of the connector.

24. The item stabilizer of claim 1, wherein the connector is configured to be folded from the unfolded position into the folded position along at least one fold line along the upper face of the connector extending between the first and second side edges of the connector.

25. The item stabilizer of claim 9, wherein the connector has a length, a width, and a height, and wherein the width of the connector is greater than the height of the connector.

26. The item stabilizer of claim 9, wherein the connector has a length, a width, and a height, wherein the width of the connector is greater than the height of the connector, and the length of the connector is greater than the width of the connector.

27. The item stabilizer of claim 9, wherein the connector is configured to be folded from the unfolded position into the folded position along at least one fold line along the upper face of the connector extending between the first and second side edges of the connector.

28. The item stabilizer of claim 16, wherein the connector has a length, a width, and a height, and wherein the width of the connector is greater than the height of the connector.

29. The item stabilizer of claim 16, wherein the connector has a length, a width, and a height, wherein the width of the connector is greater than the height of the connector, and the length of the connector is greater than the width of the connector.

30. The item stabilizer of claim 16, wherein the connector is configured to be folded from the unfolded position into the folded position along at least one fold line along the upper face of the connector extending between the first and second side edges of the connector.

* * * * *

UNITED STATES PATENT AND TRADEMARK OFFICE
CERTIFICATE OF CORRECTION

PATENT NO.        : 9,096,348 B2
APPLICATION NO.   : 13/787563
DATED             : August 4, 2015
INVENTOR(S)       : Marc Steven Johnson et al.

Page 1 of 1

It is certified that error appears in the above-identified patent and that said Letters Patent is hereby corrected as shown below:

IN THE CLAIMS

In Claim 1, Column 8, Line 2, between "second" and "side" insert --item--.
In Claim 3, Column 8, Line 15, delete "second".

Signed and Sealed this
Twenty-sixth Day of April, 2016

Michelle K. Lee
*Director of the United States Patent and Trademark Office*